United States Patent [19]

Lane et al.

[11] Patent Number: 4,576,263

[45] Date of Patent: Mar. 18, 1986

[54] CLUTCH CONTROL

[75] Inventors: E. James Lane, Highland; Russell C. Holmes, Troy; Ronald K. Markyvech, Canton, all of Mich.

[73] Assignee: Eaton Corporation, Cleveland, Ohio

[21] Appl. No.: 592,505

[22] Filed: Mar. 23, 1984

[51] Int. Cl.⁴ .................... B60K 41/08; B60K 41/02
[52] U.S. Cl. ................ 192/0.044; 192/0.076; 192/0.09; 192/82 T
[58] Field of Search ............ 192/0.044, 0.052, 0.076, 192/0.09, 0.092, 3.58, 103 R, 30 W, 82 T

[56] References Cited

U.S. PATENT DOCUMENTS

| | | | |
|---|---|---|---|
| 4,081,065 | 3/1978 | Smyth et al. | 192/0.076 |
| 4,361,060 | 11/1982 | Smyth | 192/0.092 |
| 4,403,683 | 9/1983 | Takano | 192/0.052 |
| 4,425,992 | 1/1984 | Makita | 192/82 T |
| 4,502,579 | 3/1985 | Makita | 192/82 T |

*Primary Examiner*—George H. Krizmanich
*Attorney, Agent, or Firm*—C. H. Grace; H. D. Gordon

[57] ABSTRACT

An automatic clutch control system for controlling a vehicle master clutch (14) drivingly interposed a throttle controlled engine (12) and a change gear transmission (10) having a clutch protection portion (70) to prevent the clutch from destructively overheating due to excessive slipping is provided. The clutch protection portion (70) includes a device for maintaining a variable parameter simulating clutch operating temperature (110) and devices (104 and 116) for causing said variable parameter to be increased and decreased, respectively, at first and second rates selected to simulate clutch heating and cooling rates, respectively. A signal generating device (126) is responsive to the simulated value exceeding a predetermined limit to generate a clutch protection output singal (84) effective to cause the clutch to be operated in a non-slipping, preferably fully engaged, mode of operation. The devices (104 and 116) for causing the numerical value to be increased or decreased are actuated in response to sensed and/or calculated inputs (72, 74, 76, 78 and 82). The device (126) for generating the clutch protection signal may be reset to a non-signal generating condition in response to selected sensed and/or calculated inputs thereto.

40 Claims, 3 Drawing Figures

CLUTCH CONTROL

BACKGROUND OF THE INVENTION

1. Field of the Invention

The present invention relates to clutch controls for automatically controlling the engagement and disengagement of transmission master clutches and more particularly relates to clutch controls for master clutches utilized with mechanical transmissions, in particular with automatic mechanical transmission systems, which simulate the current clutch operating surface temperatures and automatically operate the clutch in response to a simulated temperature greater than a predetermined limit.

2. Description of the Prior Art

Automatic mechanical transmission systems and the automatic controls for the master clutches thereof are known in the prior art as may be seen by reference to U.S. Pat. Nos. 3,478,851; 3,752,284; 4,019,614; 4,038,889; 4,081,065 and 4,361,061, the disclosures of which are hereby incorporated by reference.

Briefly, in such automatic mechanical transmissions systems, various drive line operations include the supply of fuel to the engine, the engagement and disengagement of the master clutch, the shifting of the transmission and the operation of other devices such as input or output shaft brakes are automatically controlled by a control system, including a central processing unit, based upon certain measured, sensed and/or calculated input parameters. Typically, the input parameters include engine speed, throttle position, transmission input and/or output shaft speed, vehicle speed, current engaged gear ratio, application of the brakes and the like. The term throttle position is utilized to signify the position or setting of any operator controlled device for controlling the supply of fuel to an engine.

Referring specifically to the automatic clutch control, in a vehicle equipped with an automatic mechanical transmission, during normal operation, when starting from at rest or operating at a very low speed, the master friction clutch is modulated between fully disengaged and fully engaged conditions, i.e. is partially engaged, according to certain input parameters, to maintain the engine speed at a set value above idle speed and/or to achieve smooth starts. Typically, the set value is throttle position modulated to provide appropriate starting torque and the clutch is moved toward engagement and disengagement, respectively, as the engine speed increases above and falls below, respectively, the set value.

In another system, see U.S. Pat. No. 4,081,065, the clutch is modulated in accordance with throttle position, engine speed and engine acceleration.

While the above automatic mechanical transmission systems are considered to be highly advantageous, they are not totally satisfactory as, in certain start up conditions when the vehicle does not have sufficient torque in the selected gear to move the vehicle load or the vehicle does not have sufficient traction to move the load, the operator may allow the clutch to remain in the partially engaged (i.e. slipping) position for an excessive period of time which may result in excessive heat build up in the clutch and damage thereto. Such conditions can occur in starts up a steep grade and/or in mud, sand or snow.

Clutch control systems utilizing temperature sensors, such as bi-metallic reed devices or the like, located in the clutch are known in the prior art as may be seen by reference to U.S. Pat. Nos. 4,072,220 and 4,199,048, the disclosures of which are hereby incorporated by reference.

Automatic clutch controls having means to simulate heat build up by monitoring throttle position and slip are known as may be seen by reference to above-mentioned U.S. Pat. No. 4,081,065.

The prior art systems for monitoring and/or simulating clutch temperature to prevent heat related damage thereto are not totally satisfactory as the systems did not provide adequate automatic response to sensed conditions, did not interact with related automatic mechanical transmission system parameters, utilized relatively complicated, unreliable and/or expensive sensors which were difficult and/or expensive to produce, assemble and/or maintain, did not measure temperature at the operating (i.e. friction) surfaces, did not simulate clutch heating and clutch cooling conditions to accurately simulate current clutch temperature and/or based each temperature simulation from a fixed starting point not related to a constantly maintained current temperature simulation.

SUMMARY OF THE INVENTION

In accordance with the present invention, the drawbacks of prior art have been overcome or minimized by the provision of an automatic master friction clutch control system, preferably for use in an automatic mechanical transmission system, which does not require a temperature sensing device mounted to the clutch and which receives certain sensed and/or calculated inputs to accurately simulate current clutch temperature taking into account the transmission system operating conditions and the heating and cooling rates of the clutch at the operating surfaces thereof and which will automatically operate the clutch to prevent or minimize over heating related damage thereto.

The above is accomplished by providing an automatic clutch control system wherein certain input parameters are sensed and/or calculated, such as engine speed, engine acceleration, throttle position, speed difference (i.e. slip) across the clutch and/or status of the transmission. The automatic control, during the start up from rest of the vehicle, will modulate the clutch between fully engaged and fully disengaged positions and/or maintain the clutch in a selected partially engaged position, to achieve desired start up. Typically, to achieve smooth starts and not stall the engine, the clutch will be increasingly engaged as engine speed and/or engine acceleration exceed a preset value which is related to engine idle speed and/or throttle position.

To protect the clutch from excessive wear and/or damage resulting from heat build up at the friction surfaces during excessively long and/or repeated clutch slipping operations, an override clutch protection system is provided. Such undesireable conditions can be caused to occur by unexperienced, unskilled and/or inattentive operator attempts to start the vehicle in unsuitable traction conditions, attempting to start the vehicle with insufficient torque in the selected gear ratio (often associated with attempting to start a heavy loaded vehicle up a steep grade) and/or driver riding the throttle to maintain a vehicle stationary on a hill.

The override control will cause the clutch to be operated in a manner which will cease slip related heat build up thereof.

The clutch will thus be caused to become fully disengaged or, preferably, fully engaged until certain conditions occur, such as simulated temperature falling below a preset value, the throttle is released and/or a shift is initialed.

Engagement of the clutch, at a preferably modulated rate, will cease slip induced heat build up thereof and will result in moving the vehicle, or stalling the engine indicating insufficient torque is available to move the vehicle in the selected gear ratio, or spinning of the drive wheels indicating that insufficient traction is available to move the vehicle.

Upon engagement of the clutch, and during all system operation, the simulated clutch temperature will be maintained current by monitoring certain sensed and/or calculated parameters and simulating cooling and/or heating of the clutch in response to the parameters at independently selected rates.

Accordingly, it is an object of the present invention to provide an automatic clutch control system for simulating a current clutch temperature from sensed and/or calculated inputs and for operating the clutch to minimize or prevent excessive wear and/or damage thereto resulting from slip related temperature build up.

This and other objects and advantages of the present invention will become apparent from a reading of the detailed description of the preferred embodiment taken in connection with the attached drawings.

DESCRIPTION OF THE PREFERRED EMBODIMENT

Figure 2:
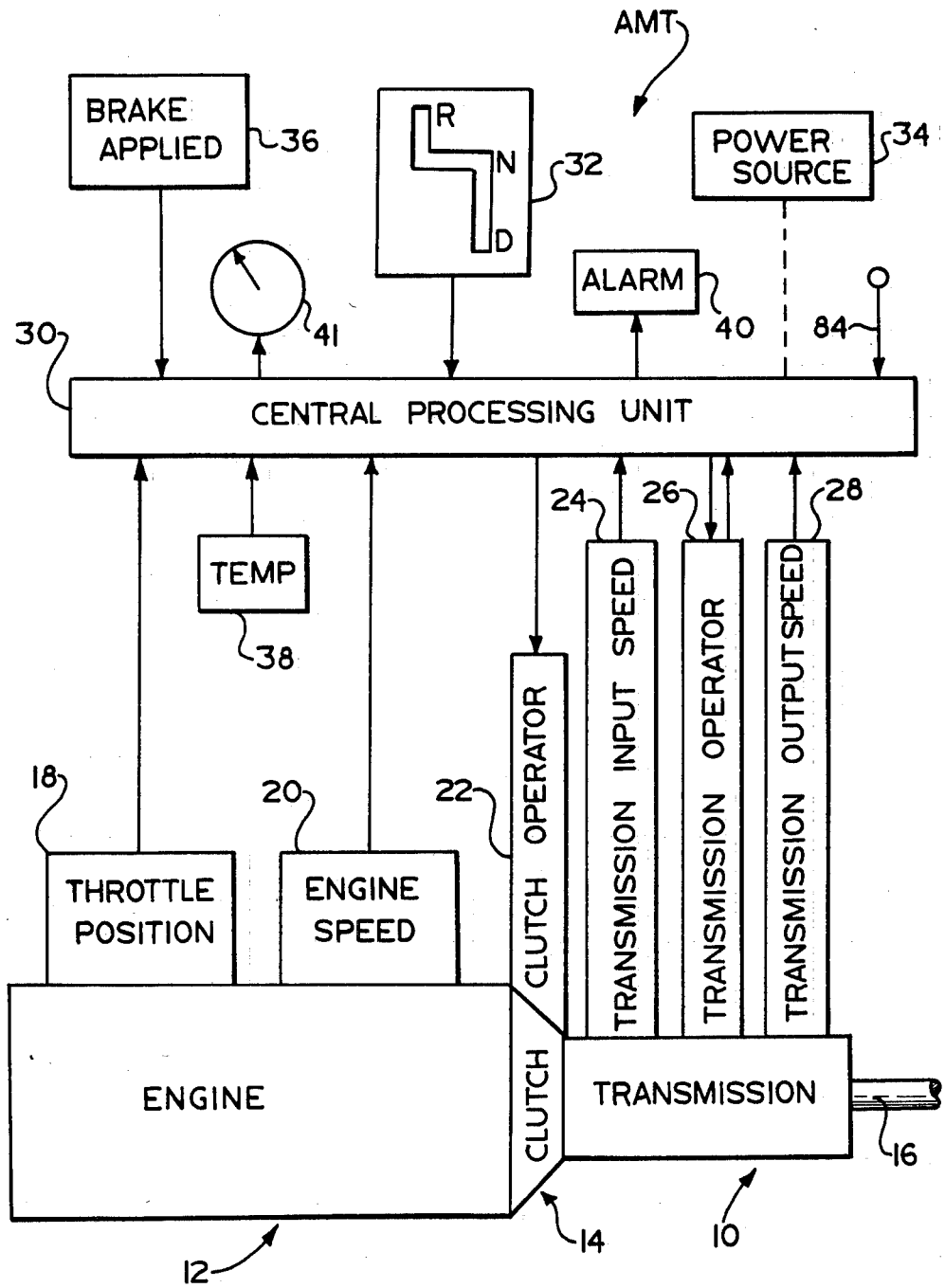
FIG. 2 is a schematic illustration of an automatic mechanical transmission control system of the type advantageously utilizing the automatic clutch control system of the present invention.

In FIG. 2, an automatic mechanical transmission system, AMT, comprising an automatic multi-speed change gear transmission 10 driven by a throttle controlled engine 12, such as a well known diesel engine, through an automatically controlled master clutch 14 is illustrated. While the automatic master control system of the present invention, to be described in greater detail below, is especially well suited for use in connection with automatic mechanical transmission systems of the type illustrated, it is understood that the automatic clutch control system of the present invention is also suitable for use with manually shifted change gear transmissions and the like.

Typically, automatic mechanical transmission systems of the type illustrated are utilized with vehicles and the output of the automatic transmission 10 is output shaft 16, which is adopted for driving connection to an appropriate vehicle component such as the differential of a drive axle, a transfer case, or the like as is well known in the prior art. The above mentioned drivetrain components are acted upon and monitored by several devices each of which will be discussed in greater detail below. These devices include a throttle position monitor assembly 18 which senses the position or setting of the operator controlled vehicle throttle or other fuel throttling device, an engine speed sensor 20 which senses the rotational speed of the engine, a clutch operator 22 which engages and disengages master clutch 14, a transmission input shaft speed sensor 24, a transmission operator 26 which is effective to shift the transmission 10 into a selected gear ratio, and a transmission output shaft speed sensor 28.

The above mentioned devices supply information to and/or accept commands from a central processing unit 30. The central processing unit 30 may include analog and/or digital electronic calculation and logic circuitry, the specific configuration and structure of which, except for the automatic clutch control portion thereof, forms no part of the present invention. The central processing unit also receives information from a shift control assembly 32 by which the operator may select a reverse (R), neutral (N) or forward (D) mode of operation of a vehicle. An electrical power source 34 and/or a source of pressurized fluid (not shown) provides electrical and/or pneumatic power to the various sensing, operating and/or processing units. A brake applied sensor 36 which senses application of a vehicle brakes, an ambient clutch temperature sensor 38 which senses ambient temperature at the clutch housing an alarm 40 which may comprise a light and/or buzzer, and/or a simulated clutch temperature indicating device such as gauge 41 may also be provided. Drive train components and controls therefore, of the type described above, are known in the prior art and may be appreciated in greater detail by reference to above mentioned U.S. Pat. Nos. 4,478,851; 4,019,614; 4,038,889; 4,081,065 and 4,361,061.

As is known, the central processing unit 30 receives direct inputs from sensor 20 indicating the present engine speed, from sensor 24 indicating the present transmission input shaft speed, from sensor 28 indicating the present transmission output shaft speed, from sensor 32 indicating the mode of operation selected by the vehicle operator, from sensor 36 indicating if the vehicle brakes have been applied and/or from sensor 38 indicating the ambient temperature in which the vehicle is operating. In addition to these direct inputs, the central processing unit 30 may be provided with circuitry whereby the signal from sensor 18 may be differentiated to provide a calculated signal indicative of the rate of change of throttle position, a circuit for differentiating the input signal from sensor 20 to provide a calculated signal indicative of the rate of acceleration of the engine, means to compare the input signals from sensors 24 and 28 to calculate a current engaged gear ratio, circuit means to compare the input signals from sensor 20 and sensor 24 to calculate slip across the clutch 14 and means to sense full release of the throttle. Full release of the throttle may be sensed by a separate switch or the like or may be sensed by a minimum value (i.e. 0% of full throttle) signal from sensor 18. The central processing unit may also comprise memory means for storing current input and/or calculated information and means for clearing the memory means upon the occurrence of a predetermined event.

Sensors 18, 20, 24, 28, 36 and 38 may be of any known type or construction for generating analog or digital signals proportional or indicative to the parameter monitored thereby. Similarly, operators 22 and 26, alarm 40 and gauge 41 may be of any known electrical, mechanical, pnuematic or electro-pnuematic type for executing operations in response to command signals from processing unit 30.

As is known, the purpose of the central processing unit is to select, in accordance with a program, the optimal gear ratio at which the transmission should be operating and if necessary to command a gear change, or shift, into the selected optimal gear ratio based upon the current and/or stored information. The commands comprise commands to the transmission operator 26 to select a desired gear ratio and to clutch operator 22 for proper operation of master clutch 14.

Figure 3:
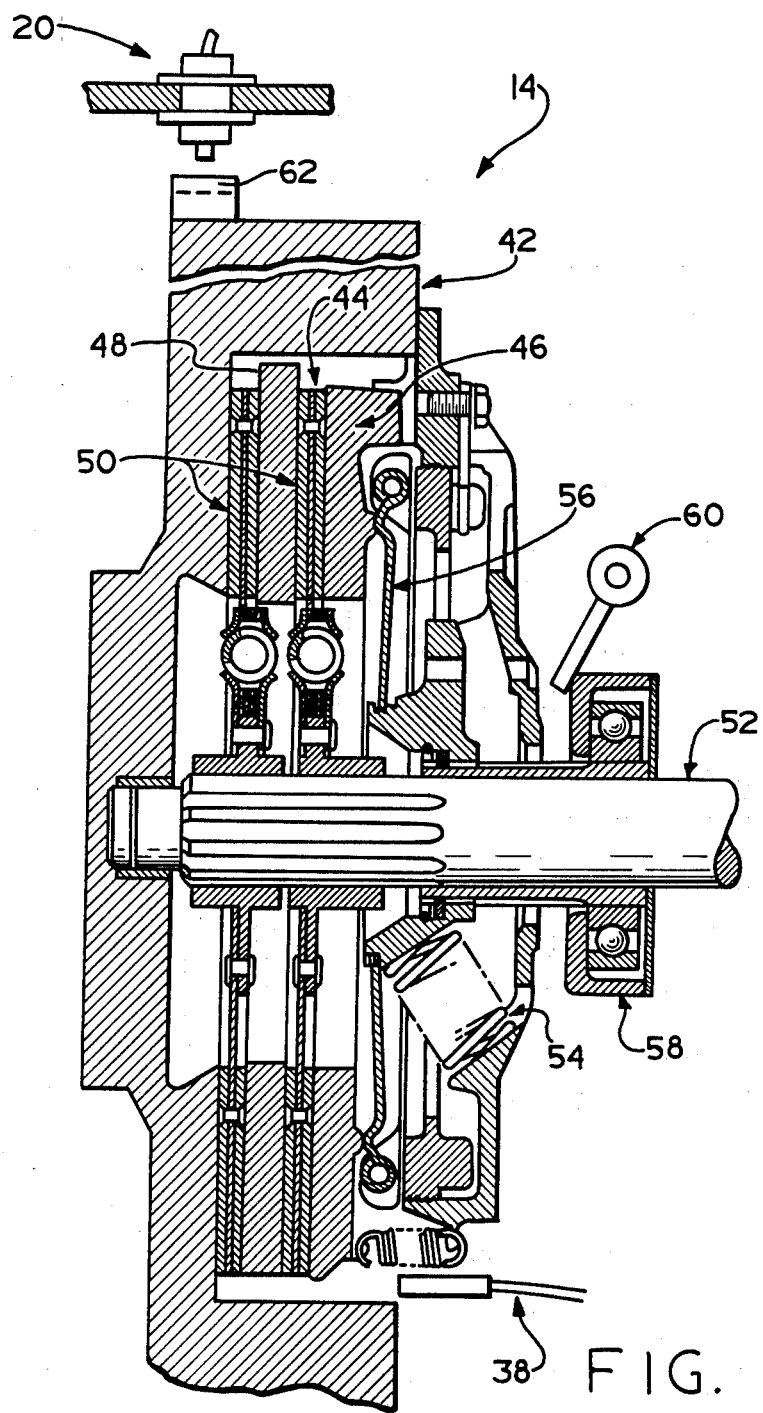
FIG. 3 is a cross sectional view of a typical master friction clutch of the type automatically controlled by the present invention.

A typical master friction clutch 14 of the type to be automatically controlled by the automatic clutch control system of the present invention may be seen by reference to FIG. 3. It is understood, of course, that the specific construction of the clutch and actuator therefore are shown for illustrative purposes and that the control system of the present invention is suitable for use in connection with clutches and/or operators therefor of differing structure. Clutch 14 illustrated is a typical two plate mechanical clutch which is mounted to an engine fly wheel 42. Internal lugs 44 on the inner radius of the fly wheel 42 correspond to slots in the clutch pressure plate 46 and intermediate plate 48 causing these elements to rotate at engine speed. They are, however, free to move in an axial direction. Clutch driven discs 50 are splined to the transmission input shaft 52. Clutch torque is provided by engaging springs 54 acting through levers 56 to apply a pressure to pressure plate 46. This pressure squeezes the driven discs 50 and intermediate plate 48 between the pressure plate 46 and the engine fly wheel 42. The magnitude of the clutch torque is proportional to this pressure.

The force provided by the spring 54 on the pressure plate 46 can be controlled by the axial position of the throw out bearing assembly 58. Throw out bearing assembly 58 can be moved in the axial direction by a cross shaft and control lever 60. The cross shaft is mounted in a clutch housing such that movement of the clutch control lever 60 will cause an axial movement of the throw out bearing assembly 58. In this manner, movement of control lever 60 can vary the force on pressure plate 46 and therefore the available clutch torque. A magnetic pickup 20 is mounted in the clutch housing and detects tooth passage of the gear teeth 62 located on the outer radius of the engine fly wheel 42 to provide a signal proportional to engine speed.

As may be appreciated, while it is fairly easy to measure ambient clutch housing temperature, measurement of operating surface temperature (such as at the surfaces of intermediate member 48) is difficult.

The automatic clutch control system of the present invention, when utilized in connection with an automatic mechanical transmission system, comprises a portion of the central processing unit 30. As indicated above, the clutch control system of the present invention may be separate and distinct from any transmission control devices.

The automatic clutch control system of the present invention is provided to automatically control the master friction clutch 14 connecting an engine 12 to a mechanical change gear transmission 10. Change gear transmissions are well known in the prior art and an example thereof may be seen by reference to U.S. Pat. No. 3,105,395, the disclosure of which is hereby incorporated by reference.

Figure 1:
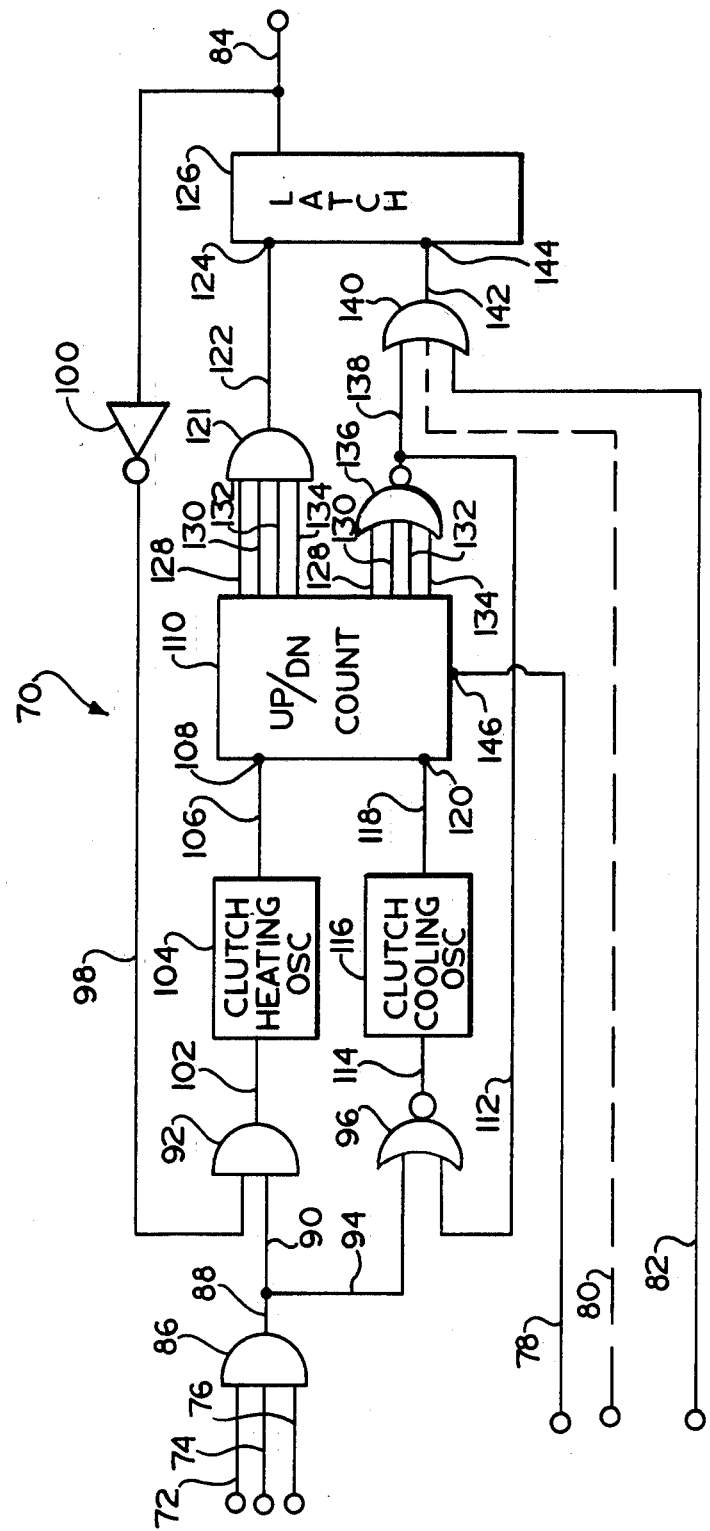
Figure 1 is a schematic logic diagram of the temperature related damage prevention override circuit of the present invention.

The automatic clutch control system of the present invention may be considered as comprising two portions, an operational portion which controls operation of the clutch to engage and disengage same in accordance with certain current and/or stored parameters and logic rules under normal operating conditions and an excessive temperature damage prevention override portion 70 schematically illustrated in FIG. 1. The operational portion of the automatic clutch control system will operate the clutch under normal operating conditions and, preferably, will be similar to the clutch control systems illustrated and described in above mentioned U.S. Pat. Nos. 4,361,060; 4,081,065 and/or 3,752,284.

The operational portion of the automatic clutch control will typically have two modes of operation, namely, a start from stop mode of operation and a gear change mode of operation when a vehicle transmission is shifted with the vehicle moving at above a given rate of speed. Typically, in the gear shift mode of operation, the master clutch is automatically caused to fully disengage at the initiation of a gear shift operation and automatically caused to fully re-engage at the completion of a gear shift operation of the change gear transmission at a rate which may be modulated or unmodulated. A considerably greater degree of control, as is well known in the prior art, is required for operation of the clutch in the start from stop mode of operation. Typically, in this mode of operation, the master clutch must be modulated between a fully disengaged and a fully engaged condition, or maintained at a predetermined partially engaged condition, in accordance with certain parameters which usually include at least engine speed and throttle position, to achieve an acceptably smooth start without stalling of the vehicle engine. During a start from stop operation, the clutch is maintained in a partially engaged condition, i.e. allowed a predetermined amount of slip, to maintain the engine speed and/or engine acceleration at above a predetermined value which value is determined by engine idle speed and throttle position. Typically, the predetermined value is proportional to sensed throttle position expressed as a percentage of wide open throttle.

As is known, maintaining the master friction clutch in a partially engaged position, i.e. allowing the master clutch to slip, will generate a considerable amount of heat, especially at the slipping friction surfaces, which will result in elevated temperatures of the operating surfaces of the master clutch, which elevated temperatures if allowed to exceed a given level may result in excessive wear and/or damage to the clutch components, especially the frictional surfaces thereof. During a typical start from stop, assuming normal operating conditions and a skilled or attentive vehicle operator, the master clutch will not remain in a partially engaged position for a period of time sufficient to elevate the temperature thereof to a dangerous level. However, under certain difficult and/or unusual start from stop conditions and/or when the vehicle is operated by an unskilled, and/or inattentive operator, it is possible that the operation of the operational portion of the automatic clutch control will maintain the master friction clutch in a partially engaged condition for periods of time sufficient to elevate the temperatures of the operating surfaces thereof to a level likely to cause undue wear and/or damage to the master clutch.

In a typical heavy duty vehicle master clutch utilizing ceramic friction materials, temperatures of about 900° F. or greater, at the friction surfaces, are considered destructive.

Conditions which may result in a vehicle master clutch, especially in an automatic mechanical transmission system equipped vehicle, destructively overheating due to excessive slipping in the absence of an overriding damage prevention means includes situations such as attempting to start a heavily loaded vehicle up a steep grade with less than required available torque capacity of the engine for a given selected gear ratio, attempting to move a heavily loaded vehicle in poor traction conditions by partially engaging the clutch thereof and/or attempting to maintain a vehicle stationary on a grade by utilizing the throttle and not the vehicle brakes. In the above conditions, if the vehicle operator is unskilled, inattentive and/or careless, in the absence of an override destruction protection means, the automatic clutch control systems of the prior art may result in the vehicle master clutch destructively overheating due to excessive slippage.

The excessive temperature damage prevention override portion 70 of the automatic clutch control system of the present invention, see FIG. 1, receives input signals 72, 74, 76, 78, 80 and 82 which may be sensed directly or which are calculated by well known logic circuitry (not shown) which circuitry may be a portion of the central processing unit 30. For purposes of this illustration, the input signals 72-82 may be considered in terms of Boolean logic wherein the presence of a signal may be represented by a "1" and the absence of a signal may be represented by a "0". An input signal will be present on line 72 if the current sensed throttle position exceeds a reference percentage of wide open throttle. The reference percentage of wide open throttle may be fixed, preferably fixed at 40% to 50%, or may be variable with other sensed parameters. Accordingly, line 72 may be considered a throttle position signal. A signal will be present on line 74 if the difference between engine speed and input shaft speed exceeds a reference value which may be fixed or variable. Accordingly, line 74 may be considered a clutch slippage signal. A signal will be present on line 76 if the transmission 10 is not in neutral and neutral has not been selected (usually by the operator). In transmission systems having a transmission driven power takeoff ("PTO"), any condition wherein the PTO is driven is considered a not in neutral condition for purposes of signal 76. A signal will be present on line 78 if a gear change operation of transmission 10 has been initiated. Where the automatic clutch control of the present invention is utilized in connection with an automatic mechanical transmission system equipped vehicle, the gear shift initiation will be initiated by the central processing unit 30. A signal will be present on line 80 if the vehicle brakes are being applied. Monitoring of the application of the vehicle brakes, and controlling the actuation of the master clutch 14 in response thereto, is considered to be optional. A signal will be present on line 82 if the vehicle throttle has been completely released, that is the operators foot has actually been removed from the throttle pedal, or if a minimum value throttle position is sensed.

The output of override portion 70 is the presence or absence of a signal on line 84. In the absence of a signal on line 84, the clutch 14 will be operated in accordance with the operational portion of the automatic clutch control system. In the presence of a signal on output line 84, the clutch 84 will be operated to prevent further slippage thereof. As explained above, it is preferred that the operation of the clutch in response to a signal on line 84 be that the master clutch is fully engaged, preferably in a modulated fashion.

Input signals 72, 74 and 76 are the inputs to an AND gate 86, which will provide a signal on line 88 only if a signal exists on each of input lines 72, 74 and 76. Accordingly, a signal is present on line 88 if and only if the sensed throttle position exceeds a predetermined percentage of wide open throttle, the difference between engine speed and input shaft speed (i.e. clutch slip) is greater than a referenced value and the transmission is not in neutral. It has been found that, in the absence of any one of the conditions indicated by a signal being present on lines 72, 74 and 76, heat build up due to excessive slipping of the master clutch will not occur. Signal line 88 splits into line 90 leading to an input of AND gate 92 and line 94 leading to an input of nor gate 96. AND gate 92 also receives an input from line 98 which is connected to output line 84 by means of an inverter 100 so that a signal is present on line 98 only if an override signal is not present on output line 84. The output of AND gate 92 is the presence or absence of a signal on line 102 which is the enabling signal to clutch heating simulation oscillator 104. Clutch heating oscillator 104, when enabled by the presence of a signal on line 102, will oscillate at a frequency indicative of the rate of heating of the partially engaged master clutch 14 during the existance of the conditions indicated by the pressure of signals on input lines 72, 74 and 76. The frequency of oscillation of oscillator 104 may be fixed to be indicative of an average rate of heating or may be variable with the current rate of clutch slippage and/or sense ambient operating conditions. For each complete oscillation of oscillator 104, a signal or pulse is outputed to line 106 which is connected to the up input 108 of up/down counter 110.

Line 94, branching from line 88 carrying the output of AND gate 86, is connected to the input of nor gate 96 which also receives an input from line 112 which, as will be described in greater detail below, carries a signal only if counter 110 has counted down to its minimum or zero value. Nor gate 96 will provide a signal on line 114 which is the enabling signal for clutch cooling simulation oscillator 116 if and only if a signal is absent on one or more of input lines 72, 74 or 76 indicating that clutch heating is no longer occuring and if counter 110 has not counted down to its lowest value corresponding generally to a minimum simulated clutch operating temperature. Clutch cooling oscillator 116 oscillates at a frequency indicative of the cooling rate of a fully engaged or fully disengaged master clutch 14 which frequency of oscillation may be fixed to simulate an average cooling rate or which may be variable with ambient operating temperature or the like. For each complete cycle of oscillator 116 a single pulse or signal is supplied to line 118 connected to the down input 120 of up-down counter 110.

It is understood that other types of periodic pulse outputing devices can be substituted for oscillators 104 and 116.

The operation of up-down counter 110 is as follows. Assuming counter 110 to be a four bit binary device, it may be pulsed to a count value having any one of 16 numeric values between "0" and "15" (0000-1111 in the binary system) and is pulsed up one binary digit for each signal pulse received at up input 108 and is pulsed down one binary digit for each signal pulse received at down input 120. Accordingly, it may be seen that up-down counter 110 may be utilized to keep a count value which is indicative of a running simulated temperature history of the simulated operating temperature of master clutch 14 taking in account the heating and cooling thereof at different rates under different operating conditions.

The outputs of up-down counter 110 are count lines 128, 130, 132 and 134. Count lines, 128, 130, 132 and 134 are connected to the individual binary bits of the up-down counter 110 and will carry a signal when the binary bit is at a one "1" value and will not carry a signal when the binary bit is a zero "0" value. All of the count lines, 128, 130, 132 and 134 are inputs to an AND gate 121 the output of which is the presence of a signal on line 122 indicating that the maximum count (binary 1111) has been achieved, which count is indicative of the clutch operating surfaces having reached an undesireably high operating temperature. If slip were to contine, a destructive operating temperature may be reached. Typically, in a clutch wherein 900° F. is considered a destructive temperature at the operating surfaces, a signal would occur on line 122 at a simulated temperature of 400° F. -500° F. Line 122 is connected to the enabling input 124 of latch mechanism 126. The presence of a signal at enabling input 124 of latch 126 will cause latch 126 to place, and until reset maintain, a signal on line 84 which is the override signal to the clutch operating means. All of the count lines, 128, 130, 132 and 134 are inputs to a nor gate 136 which will provide an output signal to line 138 if and only if all of the binary bits in the up-down counter 110 are at a zero ("0") value (binary count value 0000) corresponding to the lowest simulated clutch operating temperature. As indicated previously, line 112 branches from line 138 and leads to an input of nor gate 96 whereby the clutch cooling oscillator 116 is enabled if and only if the simulated clutch temperature is above the lowest simulated value and at least one of the conditions indicated by signals on input line 72, 74 and 76 are not true.

Line 138 which carries a signal only if the simulated clutch temperature is at the lowest simulated value (i.e. binary "0000" in counter 110) is connected to one input of OR gate 140. Also connected to inputs of OR gate 140 are optional input signal line 80 which carries a signal if the brakes have been applied and input line 82 which carries a signal only if the vehicle operator has released the throttle pedal. The output of OR gate 140 is a signal on line 142 connected to the reset input 144 of latch 126. The presence of a signal at the reset input 144 will reset the override output signal on line 84 to zero (i.e. the lack of a signal) regardless of the previous condition thereof. Accordingly, at any time that the simulated clutch temperature reaches the lowest simulated value, or the operator totally releases the vehicle throttle (or possibly if the vehicle brakes have been applied) a signal is supplied to the reset input 144 to latch mechanism 126 which will reset the output signal on line 84 to zero. It is important to understand, that a signal to reset input 144 of latch mechanism 126, while resetting the override output signal to zero, will not alter the current count of the up-down counter 110 which is a simulation of the current clutch operating temperture in view of the monitored input parameters.

It has been found, that when the simulated clutch temperature is at it lowest simulated value, or when the vehicle operator releases the throttle pedal, indicating he is aware of an existence of a problem, that is safe to remove the override signal and to allow the operation portion of the automatic clutch control to operate in its normal manner subject to, of course, later overriding action in view of simulated clutch temperature reaching the destructively overheated reference value. Input line 78, which carries a signal only upon initiation of an upshift, is connected to the reset input 146 of the up-down counter 110. The presence of a signal at reset input 146 of counter 110 will cause the up-down counter to be reset to its lowest value (i.e. binary 0000) which will, of course, result in a signal to the reset input 144 of latch 126. It has been found, in a vehicle equipped with an automatic mechanical transmission system, that when the central processing unit calls for an upshift, this is indicative that the vehicle has reached proper acceleration to continue to move in a normal manner and thus is, not in the start from stop mode. It is understood, of course, that for manually shifted transmissions, this input may not be utilized.

It is recognized that the particular configuration of the logic circuit, and elements thereof, schematically illustrating the override portion 70 of the automatic clutch control system of the present invention as illustrated in FIG. 1 is subject to substitution and/or rearrangement of the specifically described components without departing from the spirit and the scope of the present invention.

AND gates, NOR gates, OR gates, signal inverters, oscillators and latches, are well known electronic components and will not be described in further detail herein. Binary counting devices such as up-down counter 110 are commercially available from manufacturers such as Radio Corporation of America as model numbers RCA-CD40192B and RCA-CD40193B. Circuit 70 may be any suitable microprocessor (with appropriate software), programable logic array, programable gate array or the like.

It is understood that a signal on line 84 may also be utilized as an input to the CPU 30 which CPU will utilize the signal in combination with other sensed and-/or calculated inputs to operate the master clutch. In such a system, depending upon the CPU logic rules and the other sensed and/or calculated inputs, the clutch may be allowed to continue to slip, the supply of fuel to the engine may be decreased or other actions may be commanded.

Accordingly, as may be seen, an automatic clutch control system, preferably for use in connection with a vehicle equipped with an automatic mechanical transmission system, is provided which includes an excessive temperature damage prevention or minimization override portion to prevent or minimize the existence of conditions whereat the vehicle master clutch will tend to destructively overheating due to excessive slippage thereof and to provide the vehicle operator with a physical indication that he is exceeding the capability of the vehicle under the current operating conditions. The override portion of the automatic clutch control system maintains a simulated current clutch operating temperature value, which value is increased in accordance with a selected expected rate of clutch heating resulting from sensed clutch slippage conditions and which value is decreased in accordance with a selected rate of clutch cooling in the presence of non-slipping clutch operating conditions. When the simulated clutch operating temperature value reaches a value indicative of impending destructive overheating thereof, an override signal is provided to the clutch control to prevent partially engaged operation thereof. Preferably, in response to the override signal, the master clutch is fully engaged.

Although, the present invention has been set forth with a certain degree of particularity, it is understood that various modification and substitution and rearrangement of the components are possible without departing from the spirit and the scope of the invention as hereinafter claimed.

I claim:

1. An automatic control system for automatically operating a vehicle master clutch interconnected between a throttle controlled engine and a change gear transmission, said control system including means for receiving sensed or calculated input signals indicative of clutch, engine and transmission operating conditions and means for providing output signals to command the operation of said clutch to a first fully engaged condition, a second fully disengaged condition and a third partially engaged condition, said control system including means for simulating the current operating temperature of the clutch operating surfaces including means for increasing the simulated temperature at a first rate in response to predetermined sensed excessive clutch slippage conditions and means for decreasing the simulated temperature at a second rate in response to the absence of said predeterined excessive sensed clutch slippage conditions.

2. The automatic clutch control system of claim 1 additionally comprising means for commanding the clutch to be placed in one of said fully engaged or a fully disengaged conditions if the simulated current operating temperature exceeds a predetermined value.

3. The automatic clutch control system of claim 2, wherein said clutch is caused to assume the fully engaged condition thereof in response to said simulated current operating temperature exceeding said predetermined value.

4. The automatic clutch control system of claim 3, wherein said input signals indicative of clutch, engine and transmission operating conditions include a signal indicative of throttle position, a signal indicative of the difference between engine speed and transmission input shaft speed, and a signal indicative of the engaged condition of the transmission.

5. The automatic control system of claim 4, wherein said sensed excessive clutch slippage conditions comprise the presence of signals indicating the sensed throttle position exceeds the predetermined percentage of wide open throttle, the difference between engine speed and transmission input shaft speed exceeds a predetermined value and the transmission is engaged in a gear ratio.

6. The automatic control system of claim 5, wherein the absence of said predetermined conditions comprises the absence of any one of said signals indicating said throttle position exceeds said predetermined percentage of wide open throttle, said difference between engine speed and transmission input shaft speed exceeds said predetermined value or said transmission is engaged in a gear ratio.

7. The automatic control system of claim 2, wherein said first rate varies, proportionally with the magnitude of the difference between the engine speed and transmission input shaft speed.

8. The automatic control system of claim 5, wherein said means for simulating current clutch operating temperature has a maximum value and a minimum value and said means for increasing said simulated temperature is disabled when said simulated value reaches its maximum value and said means for decreasing said simulated temperature is disabled when said simulated value is at its minimum value.

9. The control system of claim 8, wherein said signal causing said clutch to be fully engaged is discontinued when said simulated clutch operating temperature reaches its minimum value.

10. The automatic clutch control of claim 5, wherein said input means include a signal indicating the presence or absence of the operator's foot upon the vehicle throttle and said signal commanding said clutch to be fully engaged is discontinued when the operators throttle is released.

11. An override protection control system for an automatic clutch control of the type automatically controlling a vehicle master clutch drivingly interposed a throttle controlled engine and a change gear transmission, said master clutch having a first fully engaged mode, a second fully disengaged mode and a third partially engaged mode, said automatic clutch control having an information processing unit for receiving a plurality of input signals including (1) an input signal indicative of engine speed and (2) and input signal indicative of throttle controlling means position, said processing unit including means for processing said input signals in accordance with predetermined logic rules and for generating operational output signals whereby said master clutch is operated in accordance with said logic rules, said override control system comprising;

means for maintaining an override value indicative of simulated current clutch friction surface operating temperature including means for increasing said override value in response to first sensed conditions at a first rate, means for decreasing said override value in response to second sensed conditions at a second rate and means for generating an override output signal when said override value equals a predetermined reference value.

12. The override protection control system of claim 11, wherein said override output signal will cause said clutch to assume said first operational mode thereof.

13. The override protection control system of claim 12, wherein said first rate is a rate proportional to a selected clutch friction surface heating rate and said second rate is a rate proportional to a clutch friction surface cooling rate.

14. The override protection control system of claim 13, including means for receiving additional input signals including (3) a signal indicative of transmission input shaft speed and (4) a signal indicative of the state of engagement of said transmission, said first conditions including the presence of signals indicating (5) that current throttle position is greater than a predetermined percentage of maximum throttle position, (6) that the difference between engine speed and transmission input shaft speed exceeds a predetermined value and (7) that the change gear transmission is not in neutral.

15. The override protection control system of claim 14, wherein said second set of condition includes the absence of a signal indicating (5) throttle position is greater than a predetermined percentage of maximum throttle position, (6) the difference between engine speed and transmission input shaft speed is greater than a predetermined value, or (7) the transmission is not in neutral.

16. The override protection control system of claim 14, wherein said first rate is variable with the magnitude of the difference between engine speed and transmission input shaft speed.

17. The override protection control system of claim 16, including means to receive an input signal (8) indicative of the operator completely releasing the throttle control means and means for disabling said means for generating said override signal in response to sensing operator fully releasing the throttle control means.

18. The override protection control system of claim 17, wherein sensing of said input signal indicative of operator release of said throttle control means will not vary said override value.

19. The override protection control system of claim 14, including means (9) for sensing engagement of the vehicle brake and means in response to receipt of said input signal indicating application of said vehicle brake for disabling said means generating said override signal.

20. The override protection control system of claim 14, wherein in said means for increasing said override value is disabled in response to actuation of said means for generating said override control signals.

21. The override protection control system of claim 14, wherein said override value has a preset maximum value and a preset minimum value, said means for generating an override output signal actuated when said override value equals said maximum value.

22. The override protection control system of claim 21 wherein said preset maximum value equals said predetermined reference value.

23. The override protection control system of claim 21, including means to disable said means for decreasing said override value when said override value equals said minimum value.

24. The override protection control system of claim 21, wherein said change gear transmission is an automatic mechanical transmission and including means for receiving an additional input signal (10) indicative of initiation of a transmission upshift gear change and means in response to receiving said signal indicative of initiation of a transmission upshift for resetting said override value to said minimum value.

25. The override control system of claim 24, including means for disabling said means for generating said override signal in response to said override signal equalling said minimum value.

26. The override protection control system of claim 12, including means responsive to said override signal for actuating an alarm device.

27. The override control system of claim 13, including means for sensing an ambient vehicle component operating temperature and said first and second rates are variable in accordance with said sensed vehicle component operating temperature.

28. An improved automatic clutch control system of the type automatically controlling a vehicle master clutch interposed a throttle controlled engine and a change gear transmission, said master clutch having a first fully engaged operational mode, a second fully disengaged operational mode and a third partially engaged operational mode, said automatic clutch control system having an information processing unit for receiving a plurality of input signals including (1) an input signal indicative of engine speed, (2) an input signal indicative of throttle controlling means position, (3) an input signal indicative of transmission input shaft speed and (4) an input signal indicative of the shifted condition of the transmission, said processing unit including means for processing said input signals in accordance with predetermined logic rules and for generating output signals whereby said master clutch is operated in accordance with said logic rules, said improvement comprising;

means for calculating a simulated current master clutch operating temperature including means for maintaining a simulated numerical value indicative of the simulated current clutch operating temperature, means for increasing said simulated numerical value at a first predetermined rate in response to input and/of calculated signals indicating that the throttle position is greater than a predetermined percentage of wide open throttle, the difference between engine speed and transmission input shaft speed is greater than a predetermined value and that said transmission is not in neutral, means for decreasing said simulated numerical value at a second predetermined rate in response to the absence of at least one of said sensed and/or calculated signals indicating that the throttle position exceeds said predetermined percentage of wide open throttle, that engine speed exceeds transmission input shaft speed by said predetermined value or that said transmission is not in neutral.

29. The improved automatic clutch control system of claim 28 further including means responsive to said simulated numerical value equaling a predetermined reference value for causing said control system to generate a clutch protection output signal.

30. The improved automatic control system of claim 29 wherein said clutch protection output signal is effective to command operation of said clutch in the first operational mode thereof.

31. The improved automatic clutch control system of claim 29 wherein said first rate is a rate selected to simulate the rate of heating of said master clutch in the presence of the conditions indicated by the presence of the signals enabling said means to increase said numerical value and said second rate is a rate proportional to the cooling rate of said master clutch in the absence of any one of the conditions enabling said for increasing said numerical value.

32. The improved automatic clutch control system of claim 31, said central processing unit additionally receives (5) an input signal indicative of vehicle operator release of the throttle control means and includes means responsive to receipt of said signal indicative of operator release of said throttle control means effective to disable said means for generating said clutch protection output signal.

33. The automatic control system of claim 32, including means responsive to said simulated numerical value equalling a minimum value for causing said means for generating said clutch protection output signal to be reset in a non-output signal generating condition.

34. The automatic control system of claim 33, wherein said means responsive to said simulated numerical value equalling said reference value continues to generate said clutch protection output signal until reset.

35. The automatic control system of claim 34, wherein said means responsive to said simulated numerical value equalling said reference value is a latch device having a setting input responsive to the presence of a signal thereat for setting said device to generate said output signal and a reset input responsive to a signal thereat for causing said device to be reset to a non-output signal generating condition.

36. The automatic clutch control system of claim 34 wherein said means for maintaining said simulated numerical value is an up-down counter device having an up count input and a down count input, said counter device responsive to a signal at said up input to increase said numerical value and responsive to a signal at said down input for decreasing said numerical value.

37. The automatic clutch control system of claim 36, wherein said up-down counter device is a digital device which will increase and decrease the numerical value maintained therein by a single digit, respectively, in response to a pulse received at the up count and down count, respectively, input thereof.

38. The automatic clutch control system of claim 37, wherein said up count input is connected to a first periodic pulse generated device having a first pulse generating frequency proportional to said first rate and said down count input is connected to a second periodic pulse generating device having a second pulse generating frequency proportional to said second rate.

39. The automatic clutch control system of claim 38, wherein said up-down counter has a reset input and is responsive to a signal thereat for resetting the numerical value maintained therein to said minimum value.

40. The automatic clutch control system of claim 39, wherein said processing unit additionally receives (6) an input signal indicative of a command initiating an upshift of said transmission and includes means responsive to receipt of said input signal for causing a signal to be present at said reset input of said up-down counter.

* * * * *

UNITED STATES PATENT AND TRADEMARK OFFICE
CERTIFICATE OF CORRECTION

PATENT NO. : 4,576,263

DATED : March 18, 1986

INVENTOR(S) : Lane et al

It is certified that error appears in the above—identified patent and that said Letters Patent is hereby corrected as shown below:

Column 1, above line 4, the following should be inserted:

The U.S. Government has rights in this invention pursuant to Contract No. DAAE07-82-C-4121 awarded by the U.S. Department of Defense.

Signed and Sealed this

Twenty-sixth Day of April, 1988

Attest:

DONALD J. QUIGG

Attesting Officer

Commissioner of Patents and Trademarks